United States Patent [19]
Sato et al.

[11] Patent Number: 5,991,832
[45] Date of Patent: Nov. 23, 1999

[54] EPG APPARATUS AND ITS CONTROL METHOD

[75] Inventors: Masahiko Sato, Tokyo; Tetsuya Kohno, Kanagawa, both of Japan

[73] Assignee: Sony Corporation, Tokyo, Japan

[21] Appl. No.: 08/970,614

[22] Filed: Nov. 14, 1997

[30] Foreign Application Priority Data

Nov. 19, 1996 [JP] Japan ................................. 8-323441

[51] Int. Cl.⁶ ........................... G06F 13/20; G06F 3/147; H04N 5/44
[52] U.S. Cl. ........................... 710/33; 345/327; 348/569; 348/563; 710/107
[58] Field of Search ................................. 345/327; 712/1; 348/584, 6, 14, 7, 5.5, 569, 460, 553, 734, 564, 563, 906, 12; 455/4.1, 4.2; 340/825.72; 709/303, 305, 300, 204; 714/54; 710/107, 33

[56] References Cited

U.S. PATENT DOCUMENTS

| 5,583,576 | 12/1996 | Perlman et al. | 340/460 |
| 5,596,373 | 1/1997 | White et al. | 348/569 |
| 5,715,515 | 2/1998 | Akins, III et al. | 455/4.1 |
| 5,751,335 | 5/1998 | Shintani | 348/5.5 |
| 5,787,259 | 7/1998 | Haroun et al. | 348/14 |

FOREIGN PATENT DOCUMENTS

| 0560593 | 9/1993 | European Pat. Off. . |
| 9501058 | 1/1995 | WIPO . |
| 9734413 | 9/1997 | WIPO . |

*Primary Examiner*—Daniel H. Pan
*Attorney, Agent, or Firm*—Jay H. Maioli

[57] ABSTRACT

A television receiver receives a television signal that includes electronic program guide (EPG) information and the television receiver has an EPG decoder and display for displaying the EPG information. A video tape recorder or satellite broadcast receiver is connected to the television receiver over a special bus and when the EPG information is displayed on the television receiver either the identity of the VTR or the EPG information decoded by an EPG decoder in the satellite receiver is displayed along with the EPG information decoded by the EPG decoder in the television receiver. The viewer then can select a program from among the television receiver EPG stations or select the VTR or can select a program from among the satellite broadcast receiver EPG stations.

20 Claims, 7 Drawing Sheets

12:00        CHANNEL 1 NEWS
           ■ CHANNEL 2 MOVIE
             CHANNEL 3 DOCUMENTARY
             CHANNEL 4 NEWS
             VTR

SELECT A PROGRAM YOU WANT TO WATCH.
```

■ CURSOR

12:00        CHANNEL 1 NEWS
           ▨ CHANNEL 2 MOVIE
             CHANNEL 3 DOCUMENTARY
             CHANNEL 4 NEWS
```

```
SELECT A PROGRAM YOU WANT TO WATCH.
```

▨ CURSOR

12:00      CHANNEL 1  NEWS
           ■ CHANNEL 2  MOVIE
             CHANNEL 3  DOCUMENTARY
             CHANNEL 4  NEWS
                [VTR]

SELECT A PROGRAM YOU WANT TO WATCH.
```

■ CURSOR

12:00      CHANNEL 1  NEWS
           ■ CHANNEL 2  MOVIE
             CHANNEL 3  DOCUMENTARY
             CHANNEL 4  NEWS
             VTR  MOVIE
             VTR  HOME DRAMA
             VTR  MUSIC

SELECT A PROGRAM YOU WANT TO WATCH.
```

■ CURSOR

12:00      NEWS
  13:00      MOVIE
  13:30      DOCUMENTARY
  15:00      NEWS
```

12:00      NEWS
  13:00      MOVIE
  13:30  ■   DOCUMENTARY
  15:00      NEWS
```

[OO] PRESS IT TO MAKE A
     VIDEO-RECORDING RESERVATION
   B

CURSOR

12:00 NEWS
13:00 MOVIE
13:30 ■ DOCUMENTARY
15:00 NEWS

A VIDEO-RECORDING RESERVATION OF THE DOCUMENTARY AT 13:30 HAS BEEN MADE.

■ CURSOR   C

12:00 CHANNEL 1 NEWS
■ CHANNEL 2 MOVIE
CHANNEL 3 DOCUMENTARY
CHANNEL 4 NEWS
SAT CHANNEL 1 MOVIE
CHANNEL 2 HOME DRAMA
CHANNEL 3 MUSIC

SELECT A PROGRAM YOU WANT TO WATCH.

D

■ CURSOR

FIG. 11

EPG APPARATUS AND ITS CONTROL METHOD

BACKGROUND OF THE INVENTION

1. Field of the Invention

In general, the present invention relates to an EPG (Electric Programming Guide) apparatus, that is, an apparatus having an EPG decoder. In particular, the present invention relates to a technology of displaying data concerning other external equipment on an EPG screen.

2. Description of the Related Art

In media for presenting a number of programs such as a satellite digital broadcasting system, an FM multiplex broadcasting system and the Internet, an EPG is introduced in order to improve the convenience of program selection. In the satellite digital broadcasting system, for example, EPG data such as the number of a transmitted channel, the name of a transmitted program and a schedule is decoded by an EPG decoder employed in the receiver where an EPG screen is displayed on a television monitor.

However, even though an apparatus employing an EPG decoder displays information on received programs on an EPG screen, the apparatus does not display data concerning connection with other external equipment.

SUMMARY OF THE INVENTION

It is thus an object of the present invention to provide an EPG apparatus for displaying information on other equipment such as the status of the connection of the EPG apparatus with the other equipment.

In order to achieve the object described above, the present invention provides a system comprising an EPG apparatus and an external apparatus connected to the EPG apparatus by using a communicator wherein, when the EPG apparatus detects the connection thereof to the external apparatus by the communicator, the EPG apparatus displays data concerning the external apparatus on an EPG screen of a display employed in the EPG apparatus or an EPG screen of an external display along with EPG data resulting from decoding carried out by an EPG decoder embedded in the EPG apparatus.

According to the present embodiment, an EPG apparatus is capable of detecting the fact that the EPG apparatus is connected to an external apparatus by using a communicator. In addition, the EPG apparatus displays data concerning the external equipment on an EPG screen of a display employed in the EPG apparatus or an EPG screen of an external display along with EPG data resulting from decoding carried out by an EPG decoder embedded in the EPG apparatus.

BRIEF DESCRIPTION OF THE DRAWINGS

The embodiments of the present invention will be described by referring to the following drawings wherein.

DETAILED DESCRIPTION OF THE PREFERRED EMBODIMENTS

The present invention will become more apparent from a careful study of the following detailed description of some preferred embodiments with reference to the accompanying diagrams showing the embodiments. The description is divided into the following five sections which will be explained sequentially one section after another in the order the sections are listed:

[1] System Using AV links

[2] Configuration of a First Embodiment Implementing a System Provided by the Invention

[3] Operations of the System Implemented by the First Embodiment

[4] Configuration of a Second Embodiment Implementing a System Provided by the Invention

[5] Operations of the System Implemented by the Second Embodiment

[1] System Using an AV link

Figure 1:
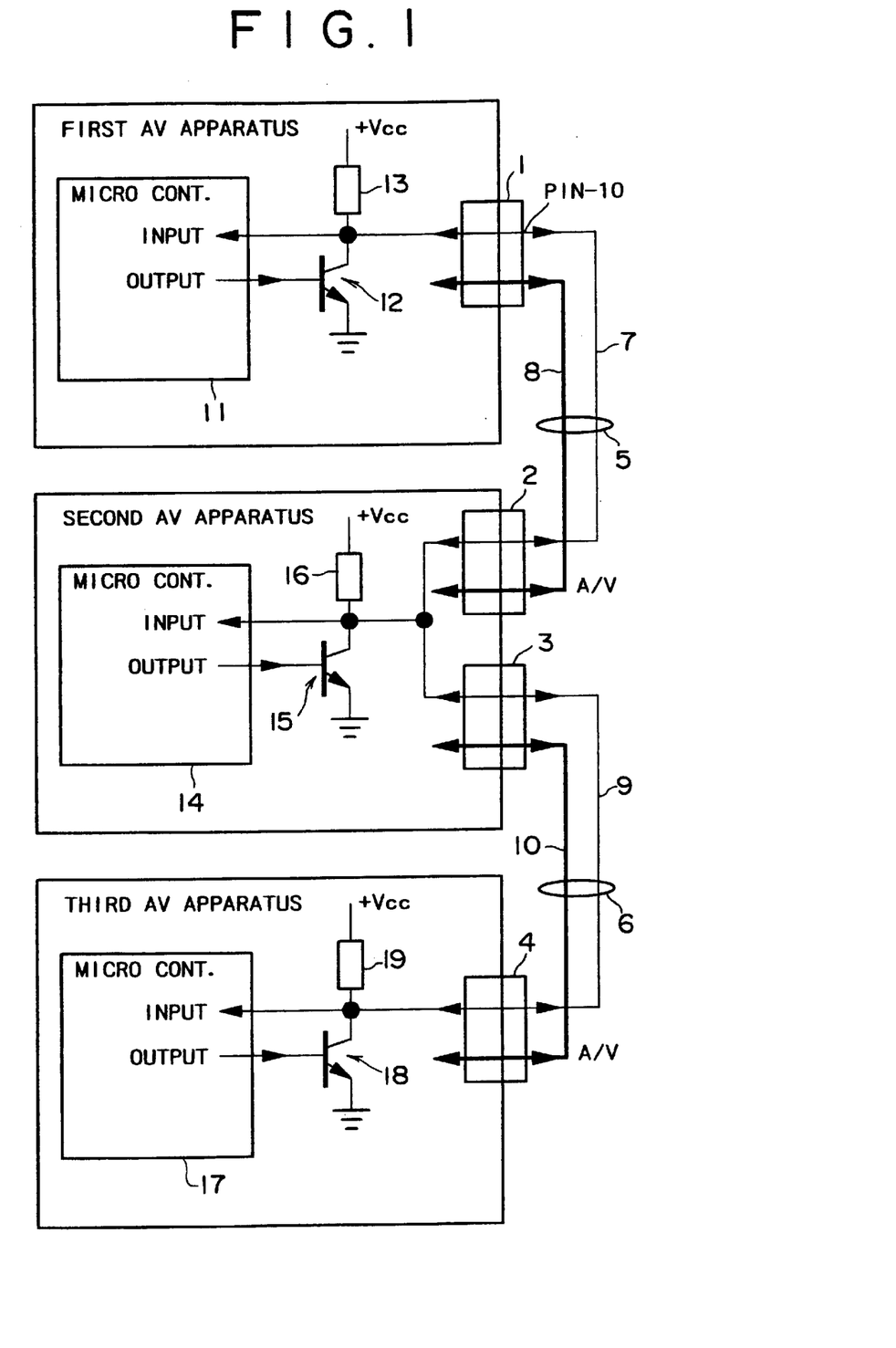
FIG. 1 is a block diagram showing a system using AV links.

FIG. 1 is a block diagram showing the configuration of a system using AV links. The system comprises first to third AV apparatuses connected by AV links. Examples of the AV apparatuses include a video tape recorder referred to hereafter simply as a VTR, a television receiver referred to hereafter simply as a TV and a tuner. The AV link conforms to a system EN-50157 standardized in Europe. The AV link is 21-pin SCART connection which includes bi-directional analog connection for transmitting both audio and video signals and bi-directional digital connection for transmitting other kinds of signal such as a control command.

As shown in the figure, the first and third AV apparatuses are provided with SCART connectors 1 and 4 respectively. On the other hand, the second AV apparatus has SCART connectors 2 and 3. A SCART cable 5 is provided between the first and second SCART connectors whereas a SCART cable 6 is provide between the third and fourth SCART connectors.

The SCART cable 5 includes a digital control signal line 7 connecting the tenth pins (pins-10) of the SCART connectors 1 and 2 to each other and analog information signal lines 8 for separately transmitting audio and video signals. By the same token, the SCART cable 6 includes a digital control signal line 9 connecting the tenth pins of the SCART connectors 3 and 4 to each other and analog information signal lines 10 for separately transmitting audio and video signals. The analog and video signals are abbreviated hereafter to an AV signal.

The first AV apparatus employs a microcontroller 11 for inputting and outputting digital control signals described earlier. An input terminal of the microcontroller 11 is connected to the tenth pin of the SCART connector 1. A bidirectional arrow passing through the tenth pin indicates that the digital control signal line 7 is a bi-directional bus line.

In addition, a voltage +Vcc of a power supply is supplied to the input terminal of the microcontroller 11 through a resistor 13. Furthermore, an output terminal of the microcontroller 11 is connected to the base of an output transistor 12. The collector of the output transistor 12 is connected to the junction between the input terminal of the microcontroller 11 and the resistor 13, that is, the end of the resistor 13 on the opposite side to the power-supply voltage +Vcc.

Much like the first AV apparatus, the second and third AV apparatuses also employ microcontrollers 14 and 17, resistors 16 and 19 and output transistors 15 and 18 respectively. The input terminal of the microcontroller 14 is connected to the tenth pins of the SCART connectors 2 and 3 whereas the input terminal of the microcontroller 17 is connected to the tenth pin of the SCART connector 4. The input terminals of the microcontrollers 14 and 17 are connected to the power-supply voltage +Vcc through their respective resistors 16 and 19 and output terminals thereof are connected to their respective output transistors 15 and 18 in the same way as the first AV apparatus.

The description given so far explains the input/output connection of a digital control signal. In actuality, the first to third AV apparatuses are each provided with a block, which is not shown in the figure, for processing an AV signal. In addition, bi-directional arrows on the connections of the analog information signal line 8 to the SCART connectors 1 and 2 indicate that an analog information signal can be transmitted in both directions through the analog information signal line 8. By the same token, bi-directional arrows on the connections of the analog information signal line 10 to the SCART connectors 3 and 4 indicate that an analog information signal can be transmitted in both directions through the analog information signal line 10.

In this way, by using one SCART cable for connecting any two units of the first, second and third AV apparatuses, the AV signal and the digital control signals can be transmitted among the AV apparatuses in both directions.

Figure 2:
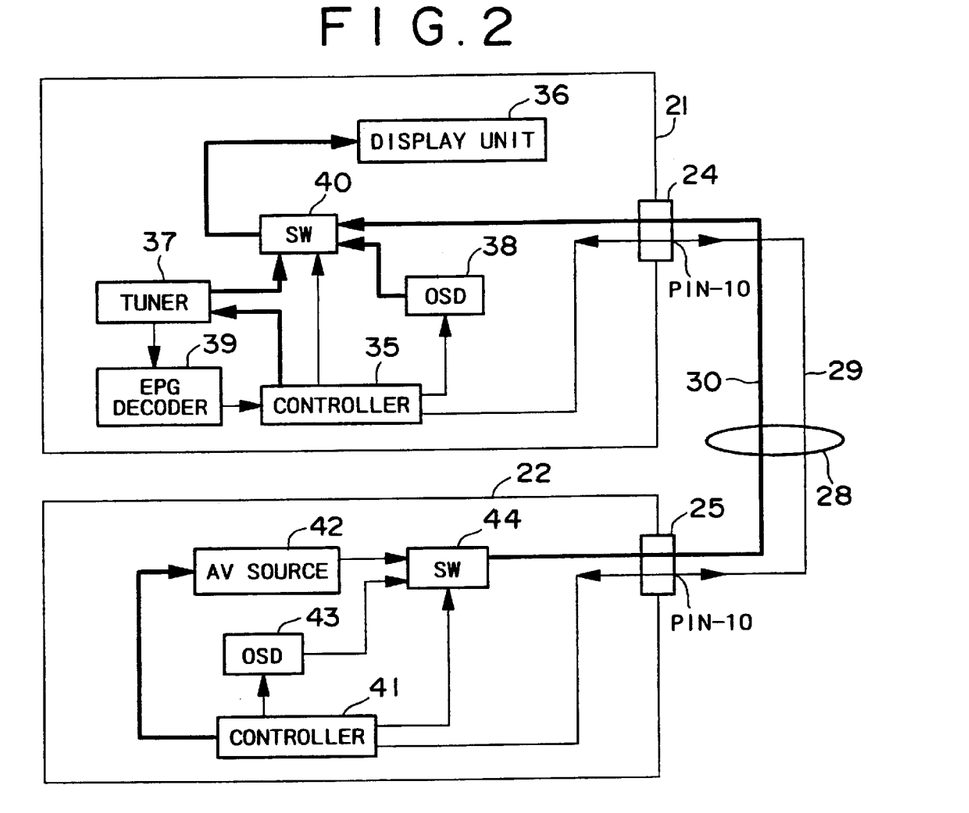
FIG. 2 is a block diagram showing the configuration of a first embodiment implementing a system to which the present invention is applied.

[2] Configuration of a First Embodiment Implementing a System Provided by the Invention FIG. 2 is a block diagram showing the configuration of a first embodiment implementing a system to which the present invention is applied. As shown in the figure, the system comprises a TV 21 and a VTR 22. In both the TV 21 and the VTR 22, an EPG decoder is embedded. A SCART cable 28 is used for connecting a SCART connector 24 provided on the TV 21 to a SCART connector 25 of the VTR 22. The SCART cable 28 includes a digital control signal line 29 connecting the tenth pins of the SCART connectors 24 and 25 to each other and an analog information signal line 30 for transmitting an AV signal. As described above, the digital control signal line 29 and the analog information signal line 30 are capable of transmitting a digital control signal and an AV signal respectively in both directions.

The TV 21 comprises a controller 35 for implementing functions such as management and control of the TV 21 as a whole, a display unit 36 for outputting pictures and sound, a tuner 37, an on-screen-display (OSD) unit 38, an EPG decoder 39 and a switch 40 for selecting a signal output by the tuner 37, the OSD unit 38 or the analog information signal line 30 as an input to the display unit 36.

On the other hand, the VTR 22 comprises a controller 41 for implementing functions such as management and control of the VTR 22 as a whole, an AV (audio/video) source 42, an OSD unit 43 and a switch 44 for selecting a signal output by the AV source 42 or the OSD unit 43 as an input to the analog information signal line 30. The AV source 42 has functions of a tuner and an AV-signal video-recording/playback system.

[3] Operations of the System Implemented by the First Embodiment Shown in FIG. 2

Figure 3:
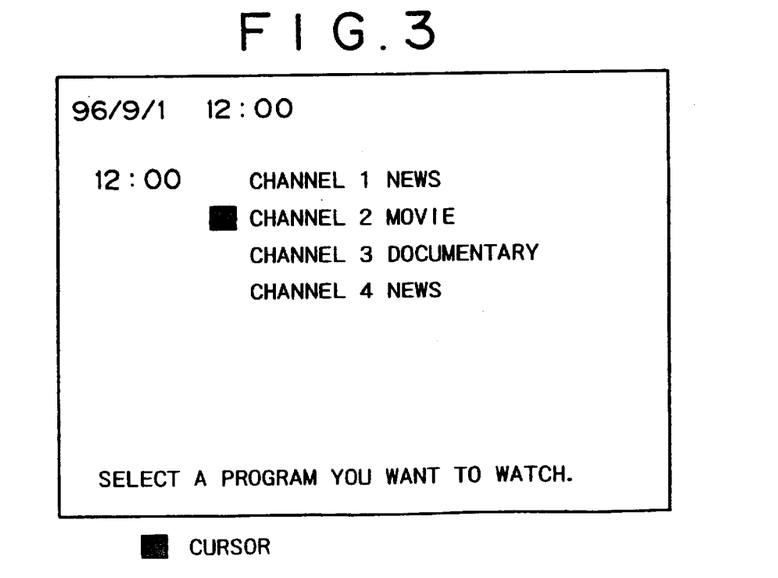
FIG. 3 is a diagram showing an example of an EPG screen displayed initially on the display unit of a TV.

Operations of the system shown in FIG. 2 are classified into the following two categories:

(1) operations to select a program and (2) operations to make a video-recording reservation (1) Operations to select a program First of all, assume that an EPG screen displayed initially on the display unit 36 of the TV 21 is like one shown in FIG. 3. The display screen merely shows channels 1 to 4, which shows broadcasted programs received by the tuner 37, and does not make the TV watcher aware of the fact that the VTR 22 is connected to the TV 21.

The TV 21 and the VTR 22 are capable of exchanging data with each other through the digital control signal line 29. As part of the exchange of data, the TV 21 carries out an operation such as polling to detect the connection with the VTR 22. A typical way to detect the connection with other pieces of equipment including the VTR 22 is assignment of a fixed address to each of the pieces of equipment. For example, an address of 0001 is assigned to the VTR 22. The controller 35 employed in the TV 21 outputs a packet including the address assigned to the VTR 22 to the digital control signal line 29. Receiving the packet, the controller 41 employed in the VTR 22 returns an ACK (acknowledge) signal to the TV 21 in response to the packet. The ACK signal received by the controller 35 employed in the TV 21 is a detected evidence of the existence of equipment to which the packet has been transmitted.

Figure 4:
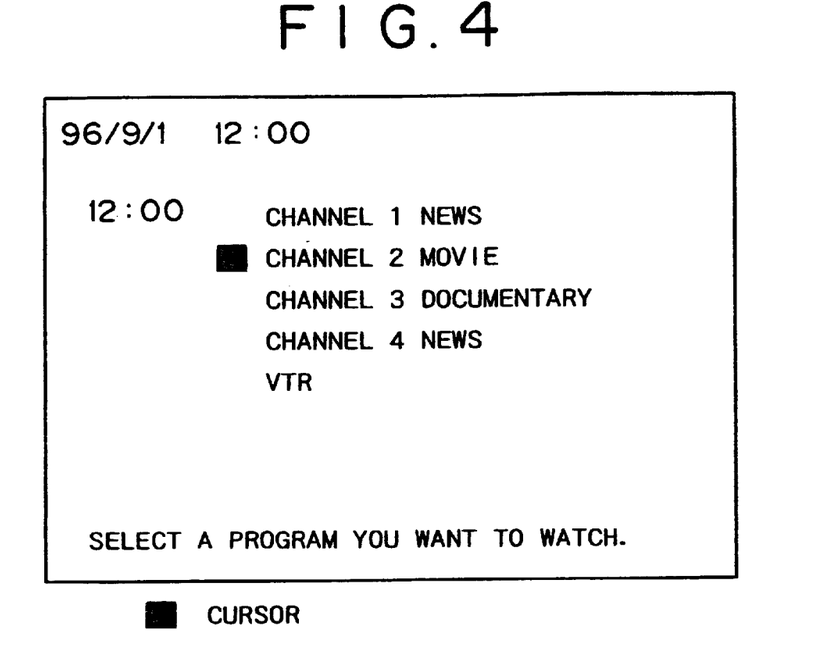
FIGS. 4 to 6 are each a diagram showing an example of an EPG screen displayed after detection of a connected VTR.
Figure 5:
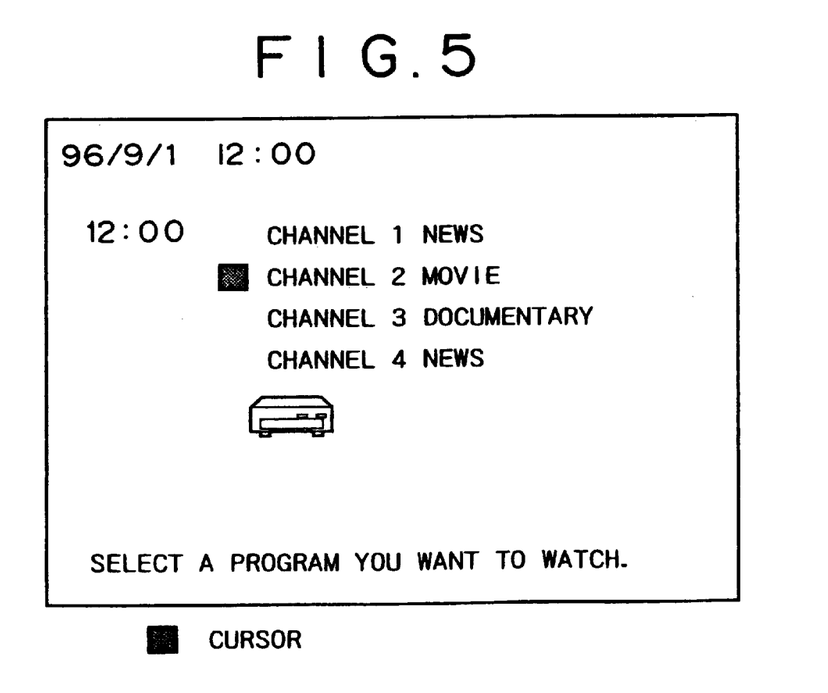
Figure 6:
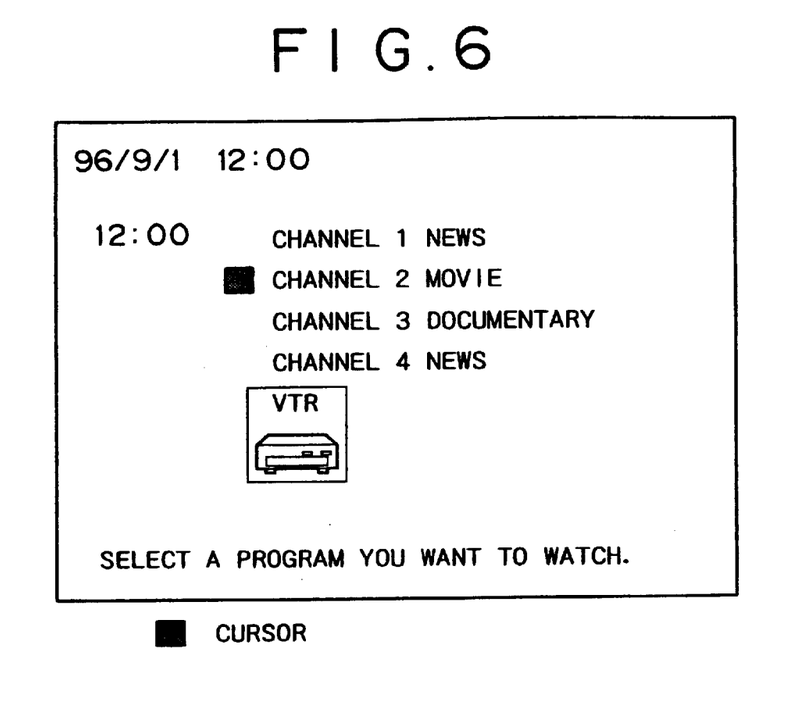

Detecting the connection of the VTR 22 to the TV 21, the controller 35 employed in the TV 21 controls the OSD unit 38 so as to display a string of characters "VTR" on the EPG screen of the display unit 36 to indicate the existence of the VTR 22 along with the broadcasted channels received by the internal tuner 37 in the TV 21 as shown in FIG. 4. In place of the string of characters "VTR", an icon to represent the VTR 22 can also be displayed as shown in FIG. 5. As another alternative, such an icon and the string of characters "VTR" can both be displayed as shown in FIG. 6.

While watching the screen shown in FIG. 4, the user selects a broadcasted program or the VTR by operating a remote controller which is not shown in the figure. Typically, the remote controller is provided with up and down move keys and a confirm key. The up or down move key is operated to move a cursor on the display screen up or down to a position beside a desired broadcasted program or beside the string of characters "VTR". In the example shown in FIG. 4, the cursor is moved to a position beside a movie of channel 2. After the cursor has been placed to a desired position, the confirm key is pressed to indicate the selection of a broadcasted program or a program to be played back from the VTR 22.

If a broadcasted program is selected, the controller 35 transmits a station-selection control signal to the tuner 37 and an AV signal of the program selected by the tuner 37 in accordance with the station-selection control signal is output to the display unit 36 by way of the switch 40. If a program to be played back from the VTR 22 is selected, on the other hand, the controller 35 sends the VTR 22 a playback command addressed to the VTR 22 through the digital control signal line 29 connected to the tenth pin of the SCART connector 24. The playback command is supplied to the controller 41 employed in the VTR 22 through the tenth pin of the SCART connector 25 provided on the VTR 22. Receiving the playback command, the controller 41 outputs a control signal to the AV source 42, requesting the AV source to output a played-back AV signal from a video tape to the analog information signal line 30 by way of the switch 44 and the SCART connector 25. The AV signal output to the analog information signal line 30 is supplied to the display unit 36 employed in the TV 21 by way of the SCART connector 24 and the switch 40.

Figure 7:
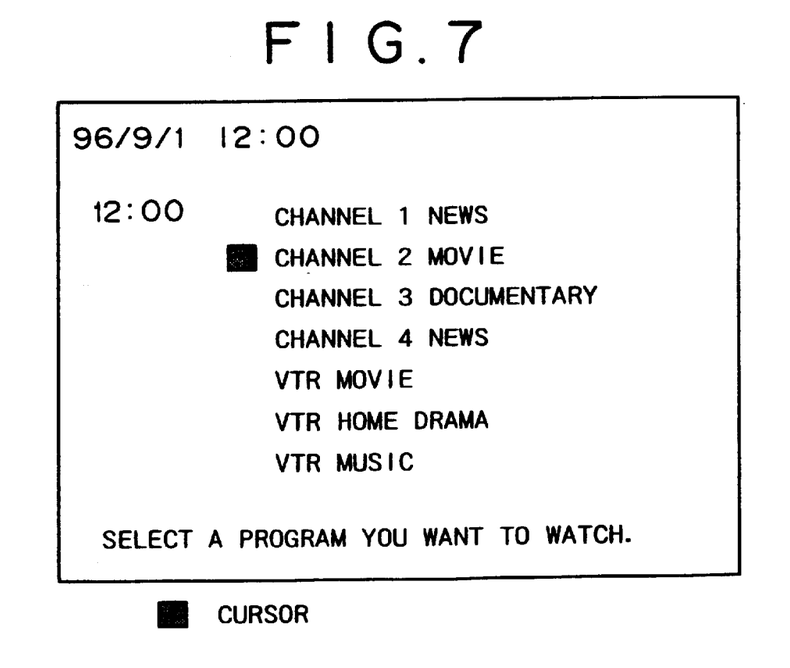
FIG. 7 is a diagram showing an example of an EPG screen displayed after detection of a connected VTR and after recognition of programs recorded in the VTR.

As described above, according to the present embodiment, either a broadcasted program or a program recorded in advance can be selected in such a uniform manner that there is no need to distinguish one from another, raising the degree of usage convenience of the system. It should be noted that the VTR 22 may employ external memory units as video-recording media or as video-recording sub-channels. In this case, it is necessary to read out the contents of what are recorded in the media. For a VTR 22 with such a configuration, the controller 35 employed in the TV 21 utilizes a control signal transmitted through the digital control signal line 29 to read out the video-recording contents and then display the contents resulting from the read operation along with the string of characters "VTR" as shown in FIG. 7. If a program to be generated by the VTR 22 is selected by the user, the TV 21 transmits an instruction to select the program and a playback command to play back the selected program to the VTR 22. Receiving the instruction the playback command, the VTR 22 starts the operation to play back the desired program and transmits the played-back program to the display unit 36 employed in the TV 21.

(2) Operations to make a video-recording reservation

Figure 8:
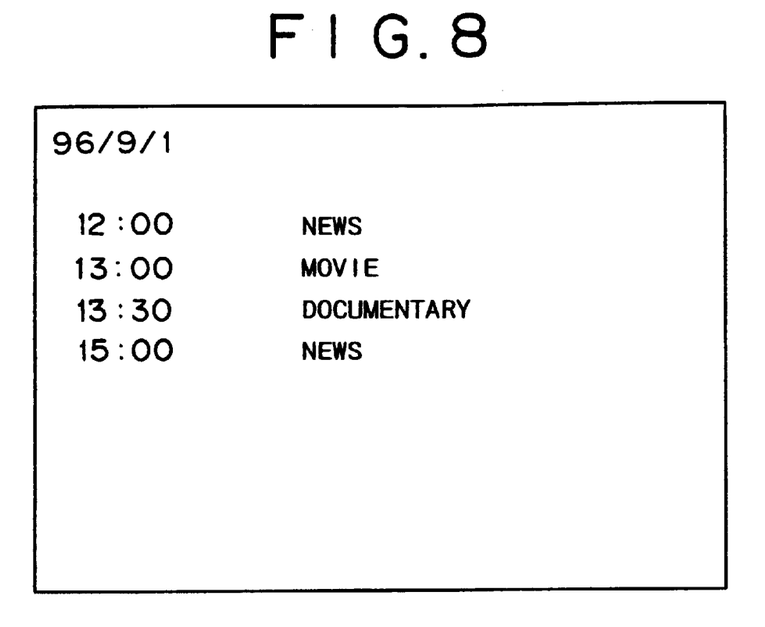
FIG. 8 is a diagram showing an example of an EPG screen displayed initially on the display unit of a TV as a video-recording-reservation screen.

First of all, an initial EPG screen is displayed on the display unit 36 as shown in FIG. 8. The display screen does not make the TV watcher aware of the fact that a VTR is connected to the TV 21.

Then, the TV 21 carries out an operation such as polling to detect the connection with the VTR 22. Detecting the connection of the VTR 22 to the TV 21, a screen A indicating the connection with the VTR 22 and the character B indicating the availability of a function for making video-recording reservations are displayed on the EPG screen of the display unit 36 along with the broadcasted channels received by the internal tuner 37 employed in the TV 21 typically like ones shown in FIG. 9.

Figure 9:
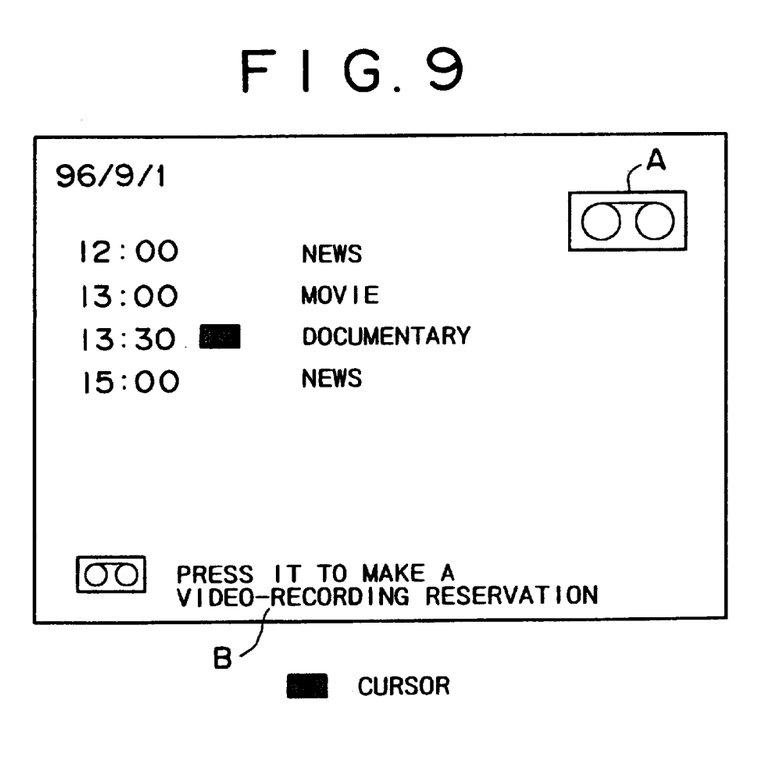
FIG. 9 is a diagram showing an example of EPG screen displayed after detection of a connected VTR for making a video-recording reservation.
Figure 10:
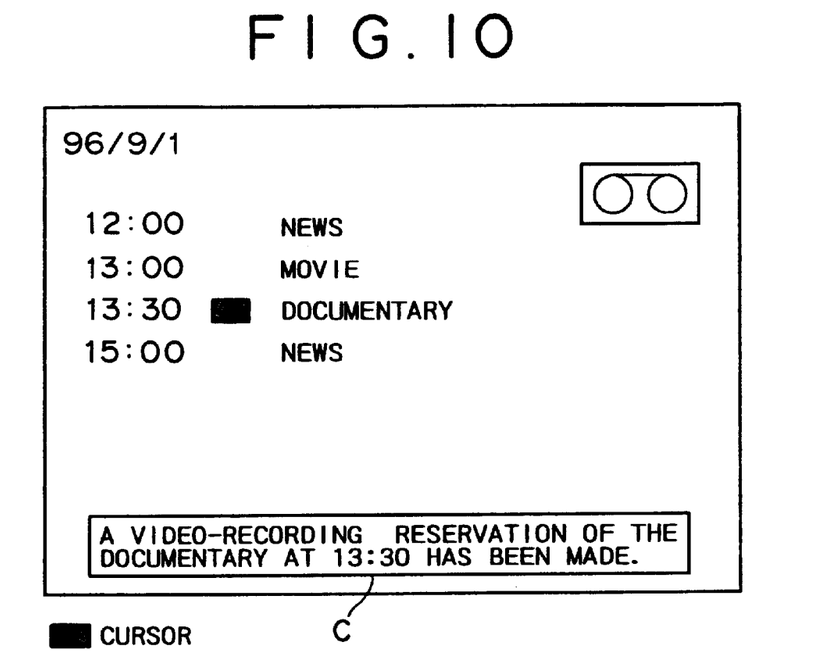
FIG. 10 is a diagram showing an example of EPG screen displayed after making a video-recording reservation

While watching the display screen like the one shown in FIG. 9, the user make a video-recording reservation by using the remote controller. Typically, the remote controller is provided with up, down, right, and left move keys and a confirm key. The up or down move key is operated to move a cursor on the display screen up or down to select a desired program. Then, the right or left move key is operated to select the screen A. Finally, the confirm key is pressed to confirm the video-recording reservation. At that time, the TV 21 transmits data representing the reserved channel and the reservation time to the VTR 22 through the digital control signal line 29 and displays a message C like one shown in FIG. 10 to indicate that the video-recording reservation has been made.

Figure 11:
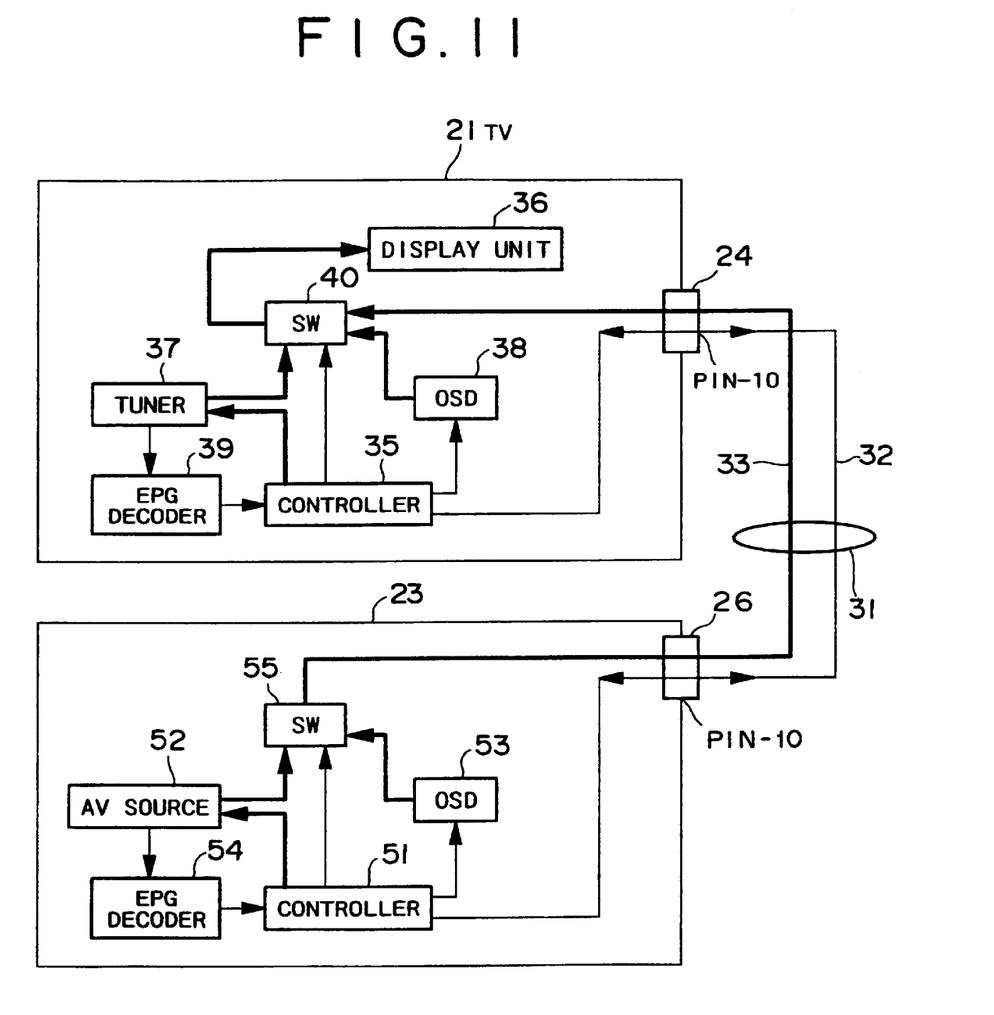
FIG. 11 is a block diagram showing the configuration of a second embodiment implementing a system to which the present invention is applied.

[4] Configuration of a Second Embodiment Implementing a System Provided by the Invention FIG. 11 is a block diagram showing a second configuration of a system to which the present invention is applied. Components of the system shown in FIG. 11 that are identical with those shown in FIG. 2 are denoted by the same reference numerals as the latter. As shown in the figure, the system comprises a TV 21 and a satellite broadcasting receiver 23 which is referred to hereafter simply as a SAT. In both the TV 21 and the SAT 23, an EPG decoder is embedded. A SCART cable 31 is used for connecting a SCART connector 24 provided on the TV 21 to a SCART connector 26 of the SAT 23. The SCART cable 31 includes a digital control signal line 32 connecting the tenth pins of the SCART connectors 24 and 26 to each other and an analog information signal line 33.

Since the configuration of the TV 21 is the same as that shown in FIG. 2, its explanation is not repeated. The SAT 23 comprises a controller 51 for implementing functions such as management and control of the SAT 23 as a whole, a tuner 52, an OSD unit 53, an EPG decoder 54 and a switch 55 for selecting a signal output by the tuner 52 or the OSD unit 53 as an input to the analog information signal line 33.

[5] Operations of the System Implemented by the Second Embodiment Shown in FIG. 11

First of all, an initial EPG screen is displayed on the display unit 36 as shown in FIG. 3. The display screen does not make the TV watcher aware of the fact that the SAT 23 is connected to the TV 21.

Figure 12:
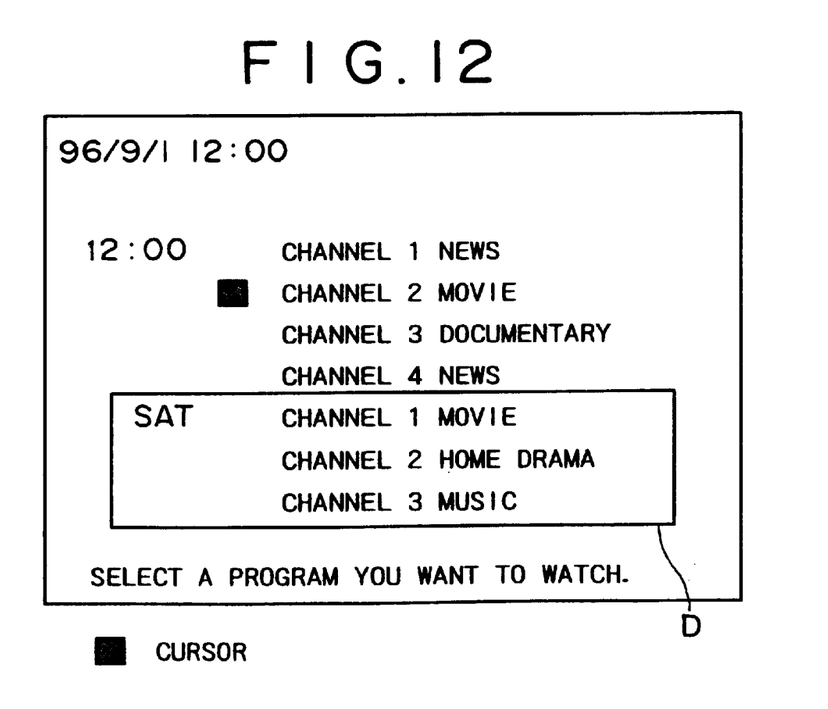
FIG. 12 is a diagram showing an example of an EPG screen displayed after detection of a connected SAT.

Then, the TV 21 carries out an operation such as polling to detect the connection with the SAT 23. As the connection is detected, EPG data from the SAT 23 is received through the digital control signal line 32 and displayed to show broad-casted programs received by the SAT 23 on the EPG screen along with broadcasted programs received by the tuner 37 employed in the TV 21 itself as shown in FIG. 12. As shown in the figure, the SAT programs are displayed in a screen area enclosed in a frame D.

While watching the screen shown in FIG. 12, the user selects a broadcasted program received by the TV 21 or a broadcasted program received by the SAT 23. However, the operation to select a program in this case is not the same as the system shown in FIG. 2. That is to say, when a broadcasted program received by the SAT 23 is selected, the TV 21 transmits a command to select the desired program to the SAT 23 through the digital control signal line 32. Receiving the command, the SAT 23 carries out required operations such as tuning and, at the same time, the TV 21 displays an AV signal on the display unit 36 employed therein.

In this way, according to the present embodiment, either a broadcasted program received by the TV 21 or a broadcasted program received by the SAT 23 can be selected in such a uniform manner that there is no need to distinguish one from another, raising the degree of usage convenience of the system.

It should be noted that, while the present invention has been described with reference to some preferred embodiments with the configurations thereof shown in FIGS. 2 and 11, the description is not intended to be construed in a limited sense. That is to say, a variety of changes and modifications can be made to the embodiments without departing from the scope of the present invention.

For example, a TV is connected to a VTR and a SAT by an AV link as shown in FIGS. 2 and 11 respectively. In this case, the AV link can be implemented by a digital bus like the IEEE1394 bus or another connection system.

In addition, in the configuration shown in FIG. 2, one unit of TV is connected to one unit of VTR. It should be noted, however, that three or more AV apparatuses can be connected to each other in a configuration like the one shown in FIG. 1. In this configuration, the first AV apparatus is a TV including no embedded EPG decoder therein whereas the second and third AV apparatuses are a SAT and a VTR respectively which each include an embedded EPG decoder. The first AV apparatus (the TV) detects connection with the second AV apparatus (the SAT) and the third AV apparatus (the VTR). Depending on a result of the detection, the EPG screen on the first AV apparatus (TV) can be changed. In the configuration shown in FIG. 9, on the other hand, one unit of TV is connected to one unit of SAT. By the same token, three or more AV apparatuses can be connected to each other in a configuration like the one shown in FIG. 1. In this configuration, the first AV apparatus is a TV including no embedded EPG decoder therein whereas the second and third AV apparatuses are a SAT and a cable TV receiver respectively which each include an embedded EPG decoder. The first AV apparatus (the TV) detects connection with the second AV apparatus (the SAT) and the third AV apparatus (the cable TV receiver). Depending on a result of the detection, the EPG screen on the first AV apparatus (TV) can be changed.

Furthermore, in the configuration shown in FIG. 2, a video tape is used as a medium for video-recording and playing back an AV signal. It should be noted, however, that a video-recording medium other than a magnetic tape can also be used as well. Examples of a video-recording medium other than a magnetic tape are a video disk for playback purposes only or for both playback and video-recording purposes.

On the top of that, the present invention can be applied not only to a ground-wave TV, a SAT and a cable TV receiver, but also to all kinds of ordinary EPG equipment, apparatuses each including an embedded EPG decoder.

What is claimed is:

1. A system comprising a television receiver receiving a signal containing electronic program guide (EPG) data and a recording/reproducing apparatus connected to the television receiver by bus means;

said television receiver including;
   an EPG decoder,
   display means for displaying EPG data decoded by said EPG decoder, and
   first control means for communicating with said recording/reproducing apparatus via said bus means, said recording/reproducing apparatus including;
   second control means for communicating with said television receiver via said bus means,
   wherein said first control means detects that said recording/reproducing apparatus is connected to said television receiver by receiving a control data from said second control means via said bus means and causes data regarding said recording/reproducing apparatus to be displayed on said display means along with said EPG data.

2. The system according to claim 1 wherein said data regarding said recording/reproducing apparatus is one of a plurality of characters and an image indicating said recording/reproducing apparatus.

3. The system according to claim 1 wherein said data regarding said recording/reproducing apparatus includes information about contents recorded on a recording medium in said recording/reproducing apparatus.

4. The system according to claim 1 wherein, when said data regarding said recording/reproducing apparatus displayed on said display means is selected, said first control means issues an instruction to said recording/reproducing of apparatus through said bus means to request said recording/reproducing apparatus to reproduce a content recorded on a recording medium in said recording/reproducing apparatus for display on said display means.

5. A system according to claim 1 wherein said recording/reproducing apparatus includes means for making a video-recording reservation of a program to be received by said television receiver and, when said data regarding said recording/reproducing apparatus displayed on said display means is selected, said first control means issues a video-recording reservation instruction to said recording/reproducing apparatus through said bus means.

6. The system according to claim 5 wherein, after an operation to make said video-recording reservation of a program has been carried out, said television receiver displays a message on said display means to indicate that said operation to make said video-recording reservation has been carried out.

7. The system according to claim 1 wherein said bus means is substantially an AV link type of bus.

8. The system according to claim 1 wherein said bus means is substantially an IEEE 1394 type of bus.

9. The system according to claim 1 further comprising a second television receiver receiving a signal containing electronic program guide (EPG) data, said second television receiver comprising:

a second EPG decoder,
   third control means for communicating with said television receiver via second bus means, wherein said first control means detects that said second television receiver is connected to said television receiver by receiving a control data from said third control means via said second bus means and causes the EPG data decoded by said second EPG decoder to be displayed on said display along with the EPG data decoded by said EPG decoder.

10. A control method for controlling a system including an electronic program guide (EPG) apparatus having an EPG decoder and a display, a bus, and an external apparatus connected to said EPG apparatus by said bus, said control method comprising the steps of;

dislaying on said display EPG data decoded by said EPG decoder;
    causing said EPG apparatus to detect that said external apparatus is connected to said EPG apparatus by said bus; and
    upon detecting a connection to said external apparatus, causing said EPG apparatus to display data regarding said external apparatus on said display along with EPG data decoded by said EPG decoder.

11. The control method according to claim 10 wherein said data regarding said external apparatus is one of a plurality of characters and an image representing said external apparatus.

12. A control method according to claim 10 wherein said data regarding said external apparatus includes information about a content of a recording medium in said external apparatus.

13. The control method according to claim 10 wherein said system further includes a second external apparatus connected to said EPG apparatus by a second bus, wherein said second external apparatus has a second EPG decoder, the method comprising the further step of displaying second EPG program data decoded by said second EPG decoder on said display along with the EPG program data decoded by the EPG decoder of said EPG apparatus.

14. The control method according to claim 10 whereby, when said data regarding said external apparatus displayed on said display is selected, said EPG apparatus issues an instruction to said external apparatus through said bus to request said external apparatus to output the data represented by said selected data for display on said display.

15. The control method according to claim 14 wherein said external apparatus outputs a data content recorded on a recording medium in said external apparatus.

16. The control method according to claim 10 wherein said external apparatus includes a second EPG decoder.

17. The control method according to claim 10 wherein said external apparatus includes means for making a video-recording reservation of a program to be received by said EPG apparatus and whereby, when said data regarding said external apparatus displayed on said display is selected, said EPG apparatus issues a video-recording reservation instruction to said external apparatus through said bus.

18. The control method according to claim 17 whereby, after an operation to make said video-recording reservation has been carried out, said EPG apparatus displays a message on said display to indicate that said video-recording reservation has been carried out.

19. A television receiver receiving a signal containing electronic program guide (EPG) data comprising:

an EPG decoder, display means for displaying EPG data decoded by said EPG decoder, control means for communicating with an recording/reproducing apparatus via bus means, wherein said control means detects that said recording/reproducing apparatus is connected to said television receiver by receiving a control data from said recording reproducing apparatus via said bus means and causes data regarding said recording/reproducing apparatus to be displayed on said display means along with said EPG data.

20. A system comprising:

a first television receiver including a first EPG decoder, display means for displaying EPG data decoded by said first EPG decoder and first control means;

bus means;

a second television receiver connected to said television receiver by said bus means and including a second EPG decoder and second control means;

wherein said first controller detects that said second television receiver is connected to said first television receiver by receiving a control data from said second control means via said bus means and causes said EPG data decoded by said second EPG decoder to be displayed on said display along with the EPG data decoded by said first EPG decoder.

* * * * *